United States Patent

Narukawa et al.

[11] Patent Number: 5,347,124
[45] Date of Patent: Sep. 13, 1994

[54] CONTROL SYSTEM FOR OSCILLATORY-MIRROR LIGHT BEAM DEFLECTOR

[75] Inventors: Yasunori Narukawa, Kanagawa; Akinori Hamana, Omiya, both of Japan

[73] Assignees: Fuji Photo Film Co., Ltd., Kanagawa; Fuji Photo Optical Co., Saitama, both of Japan

[21] Appl. No.: 77,037

[22] Filed: Jun. 16, 1993

[30] Foreign Application Priority Data

Jun. 17, 1992 [JP] Japan .................................. 4-158268

[51] Int. Cl.$^5$ .............................................. H01J 3/14
[52] U.S. Cl. ....................................... 250/235; 358/494
[58] Field of Search ........... 250/234, 235, 236, 214 A; 358/481, 494, 496

[56] References Cited

U.S. PATENT DOCUMENTS 5,081,356  1/1992  Horikawa ............................ 250/236
5,138,478  8/1992  Ogawa ................................ 250/235

Primary Examiner—David C. Nelms
Assistant Examiner—K. Shami
Attorney, Agent, or Firm—Sughrue, Mion, Zinn, Macpeak & Seas

[57] ABSTRACT

A control system for controlling an oscillatory-mirror light beam deflector such as a resonant light beam deflector with a reflecting mirror, has a drive circuit for applying a drive signal to energize the oscillatory-mirror light beam deflector, and a detector for detecting a drive condition of the oscillatory-mirror light beam deflector and producing a drive condition signal indicative of the detected drive condition. A PID processor circuit, which is composed of a proportional circuit, an integrator, and a differentiator, generates an adjusting signal from the drive condition signal produced by the detector. The differentiator has a variable resistor for varying a feedback resistance thereof. A processor processes the drive condition signal with the adjusting signal thereby to produce the drive signal.

7 Claims, 3 Drawing Sheets

CONTROL SYSTEM FOR OSCILLATORY-MIRROR LIGHT BEAM DEFLECTOR

BACKGROUND OF THE INVENTION

1. Field of the Invention

The present invention relates to a control system for controlling an oscillatory-mirror light beam deflector with a three-mode or PID (proportional-plus-integral-plus-derivative) control loop.

2. Description of the Related Art

There has widely been used an image scanning recording and reproducing system for electrically processing image information borne by an original to produce a master in the fields of printing and photomechanical processes.

The image scanning recording and reproducing system basically comprises an image reading device and an image recording device. The image reading device reads the image information on the original in a main scanning direction while the original is being fed in an auxiliary scanning direction which is perpendicular to the main scanning direction, and converts the read image information into an electric signal. The image recording device processes the electric signal according to photomechanical processing conditions, converts the processed electric signal into an optical signal, and records the optical signal on a recording medium.

The image recording device has an oscillatory-mirror light beam deflector such as a galvanometer mirror, a resonant light beam deflector, or the like for deflecting a light beam at a high speed to record an image. The oscillatory-mirror light beam deflector has a solenoid or a motor coupled to a rotary driver and a reflecting mirror connected to the rotary driver. When an AC drive signal is supplied to the solenoid or the motor, the reflecting mirror oscillates to deflect a light beam applied thereto and scan a recording medium with the deflected light beam.

To record desired image information accurately on the recording medium, it is necessary to oscillate the reflecting mirror stably at all times. To meet such a requirement, the oscillatory-mirror light beam deflector is usually controlled through a feedback loop including a PID processor circuit.

In the PID processor circuit, a drive condition signal such as a deflection angle, which is produced by the oscillatory-mirror light beam deflector, is supplied to a differentiator, an integrator, and a proportional circuit to produce an adjustment signal. The adjusting signal and the drive condition signal are processed by a processing circuit to generate a new drive signal to be applied to the solenoid or the motor. The differentiator does not operate under steady conditions, but rather operates under transient conditions caused by the operation of an ON/OFF circuit. When the differentiator operates, the reflecting mirror, as it oscillates, may overshoot due to the characteristics of the multiplier used in the PID processor circuit or the individual attributes of the oscillatory-mirror light beam deflector employed. Overshooting may result in damage. If, however, the reflecting mirror oscillates with an insufficient amplitude, then the light beam deflected thereby will fail to fully scan the recording medium.

SUMMARY OF THE INVENTION

It is therefore an object of the present invention to provide a control system for controlling an oscillatory-mirror light beam deflector, the control system being capable of easy and optimal adjustment of the oscillating condition of a reflecting mirror.

According to the present invention, there is provided a control system for controlling an oscillatory-mirror light beam deflector, comprising a drive circuit for applying a drive signal to energize the oscillatory-mirror light beam deflector, detector means for detecting a drive condition of the oscillatory-mirror light beam deflector and producing a drive condition signal indicative of the detected drive condition, a PID processor circuit having a proportional circuit, an integrator, and a differentiator, for generating an adjusting signal derived from the drive condition signal produced by the detector means, and a processor for processing the drive condition signal with the adjusting signal thereby to produce the drive signal.

The characteristics of the PID processor circuit are adjusted by the variable resistor of the differentiator, and the resulting adjustment signal is combined with the drive condition signal by the processor to generate the drive signal. The amplitude of oscillation of a reflecting mirror of the oscillatory-mirror light beam deflector can thus be set to an optimum range.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
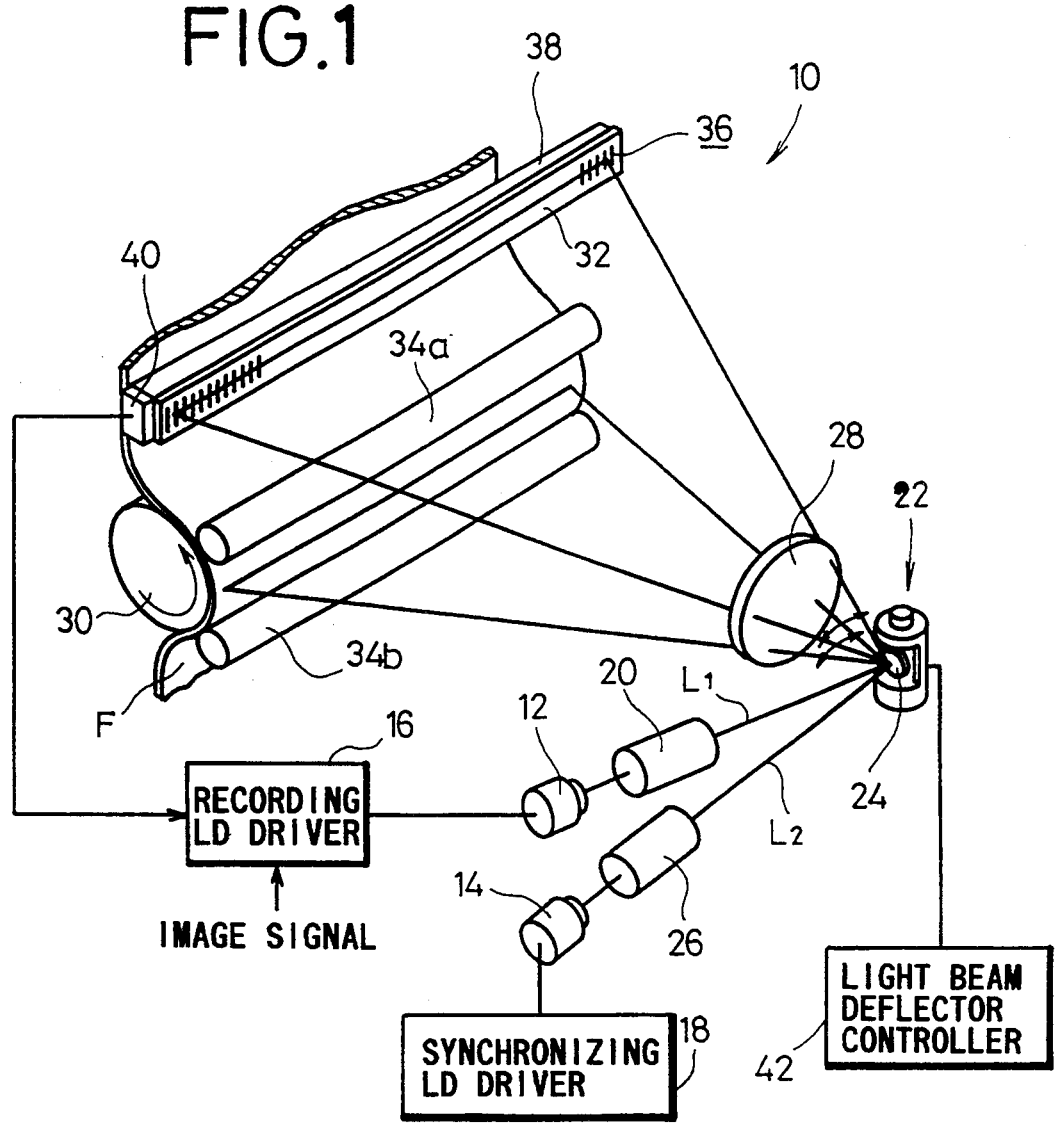
FIG. 1 is a schematic perspective view, partly in block form, of an image recording device incorporating a control system for controlling an oscillatory-mirror light beam deflector according to the present invention.

As shown in FIG. 1, an image reading device, generally designated by the reference numeral 10, has a recording laser diode 12 for emitting a recording laser beam $L_1$ and a synchronizing laser diode 14 for emitting synchronizing laser beam $L_2$. The recording laser diode 12 is controlled by a recording LD driver 16, and the synchronizing laser diode 14 is controlled by a synchronizing LD driver 18.

The recording laser beam $L_1$ emitted by the recording laser diode 12 is converted by a collimator 20 into a parallel laser beam which is applied to a reflecting mirror 24 of a resonant light beam deflector 22. The synchronizing laser beam $L_2$ emitted by the synchronizing laser diode 14 is converted by a collimator 26 into a parallel laser beam which is also applied to the reflecting mirror 24.

The recording laser beam $L_1$ and the synchronizing laser beam $L_2$ are reflected by the reflecting mirror 24 and applied through an $f\theta$ lens 28 respectively to a drum 30 and a grid 32 extending parallel to the drum 30. As the reflecting mirror 24 oscillates, the recording laser beam $L_1$ and the synchronizing laser beam $L_2$ are deflected back and forth to scan the drum 30 and the grid 32 in a main scanning direction along their axes. A pair of nip rollers 34a, 34b is held against the drum 30 with a photosensitive film F interposed therebetween. When the drum 30 rotates about its own axis in the direction indicated by the arrow, the photosensitive film F is fed in an auxiliary scanning direction perpendicular to the main scanning direction, i.e., to the axes of the drum 30 and the nip rollers 34a, 34b.

The grid 32 has an array of slits 36 defined in its surface facing the resonant light beam deflector 22 and equally spaced along the main scanning direction. Disposed behind the grid 32 is a light guide rod 38 which is tapered from one end to the other relative to the front face of grid 32. A light detector 40 such as a PIN photodiode or the like is attached to the larger end of the light guide rod 38. The light detector 40 applies an output signal as an electric signal for generating a synchronizing signal to the recording LD driver 16.

The resonant light beam deflector 22 is controlled by a light beam deflector controller 42 which serves as a control system for controlling an oscillatory-mirror light beam deflector according to the present invention.

Figure 2:
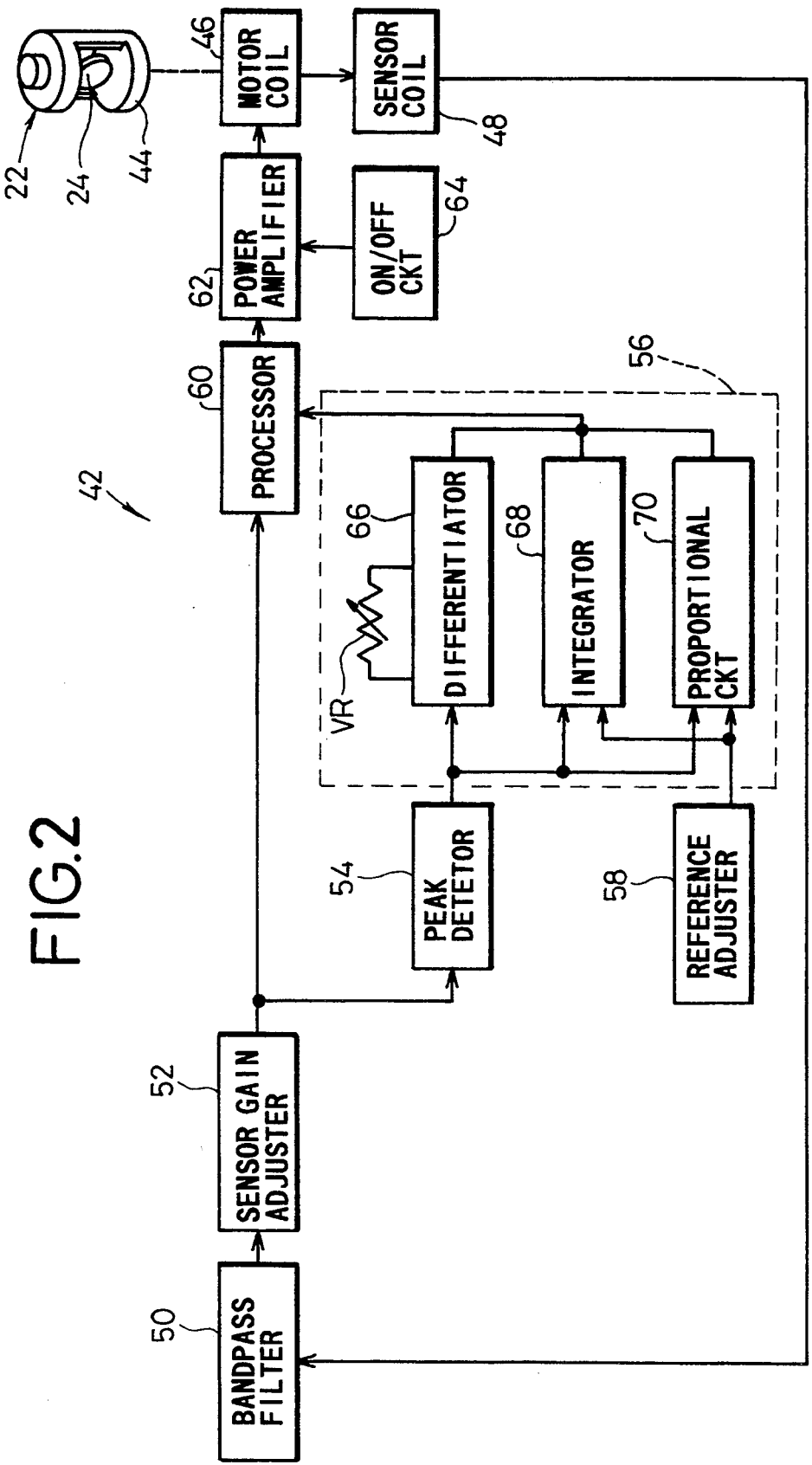
FIG. 2 is a block diagram of the control system.

FIG. 2 shows the light beam deflector controller 42 in block form. The light beam deflector controller 42 comprises a motor coil 46 for actuating the reflecting mirror 24 which is housed in a casing 44, a sensor coil 48 for detecting the deflection angle of the reflecting mirror 24, a bandpass filter 50 for removing noise from a deflection angle signal generated by the sensor coil 48, a sensor gain adjuster 52 for adjusting the level of the deflection angle signal, a peak detector 54 for detecting the peak value of an output signal from the sensor gain adjuster 52, a PID processor circuit 56 for generating an adjusting signal based on the peak value detected by the peak detector 54, a reference adjuster 58 for supplying a reference signal to the PID processor circuit 56, a processor 60 for adding the adjusting signal from the PID processor circuit 56 to the output signal from the sensor gain adjuster 52 to generate a drive signal, a power amplifier 62 for amplifying the drive signal and applying the amplified drive signal to the motor coil 46, and an ON/OFF circuit 64 for turning on and off the resonant light beam deflector 22. The processor 60 may comprise an N-channel FET or the like for controlling the output signal from the sensor gain adjuster 52 with the adjusting signal applied as a gate signal.

The PID processor circuit 56 comprises a differentiator 66, an integrator 68, and a proportional circuit 70 which are supplied with the peak value from the peak detector 54. The integrator 68 and the proportional circuit 70 are also supplied with the reference signal from the reference adjuster 58.

Figure 3:
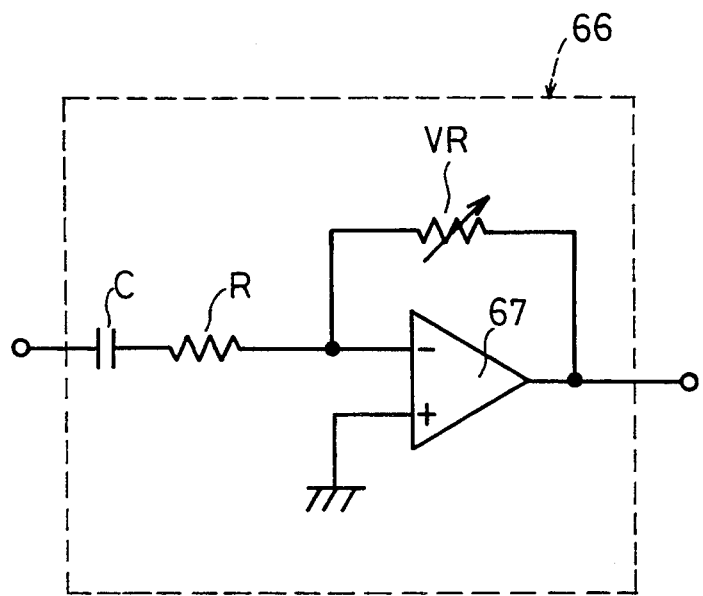
FIG. 3 is a block diagram of a differentiator in the control system shown in FIG. 2.

As shown in FIG. 3, the differentiator 66 comprises a capacitor C, a resistor R connected in series to the capacitor C, an operational amplifier 67 having an inverting input terminal connected to the resistor R and a noninverting input terminal grounded, and a variable resistor VR connected between the inverting input terminal and output terminal of the operational amplifier 67. The feedback resistor of the differentiator 66 can be varied by the variable resistor VR.

Operation of the image recording device 10 and the light beam deflector controller 42 will be described below.

First, a processor adjusting the resonant light beam deflector 22 will be described below with reference to FIG. 2. The ON/OFF circuit 64 is turned on with the variable resistor VR of the differentiator 66 being of a large value. Since the contribution ratio of the differentiator 66 is large at this time, the PID processor circuit 56 applies an adjusting signal of a high output level to the processor 60. If the processor 60 comprises an N-channel FET, for example, the drive signal produced thereby is of a low level. The power amplifier 62 supplies the drive signal to the motor coil 46 for starting to oscillate the reflecting mirror 24 of the resonant light beam deflector 22. The deflection angle of the reflecting mirror 24, i.e., the angle through which the reflecting mirror 24 oscillates back and forth, is detected by the sensor coil 48, and supplied as a drive condition signal through the bandpass filter 50 to the sensor gain adjuster 52. The sensor gain adjuster 52 adjusts the level of the drive condition signal, and then applies this signal to the processor 60 and the peak detector 54. The peak detector 54 detects the peak value of the supplied signal, and outputs the detected peak value to the PID processor circuit 56. The PID processor circuit 56 generates an adjusting signal from the peak value and the reference signal from the reference adjuster 58, and supplies the generated adjusting signal to the processor 60. The processor 60 processes the drive condition signal from the sensor gain adjuster 52 into a drive signal based on the adjusting signal, and supplies the drive signal to the power amplifier 62. The drive signal which is amplified by the power amplifier 62 is supplied to the motor coil 46 to adjust the operation of the resonant light beam deflector 22.

Since the variable resistor VR is initially of a large value, the rate of control by the differentiator 66 is high, but the drive signal from the processor 60 is low. Therefore, the amplitude of oscillation of the reflecting mirror 24 is prevented from increasing greatly.

The ON/OFF circuit 64 is turned off, the value of the variable resistor VR of the differentiator 66 is decreased, and then the ON/OFF circuit 64 is turned on. Such an adjusting procedure (whether performed automatically or manually) is repeated until the deflection angle of the reflecting mirror 24 becomes optimum, whereupon the value of the variable resistor VR is fixed.

Because the feedback resistance of the differentiator 66 is adjusted by the variable resistor VR, as described above, even if the processor 60 and the resonant light beam deflector 22 suffer individual characteristic variations, the deflection angle of the reflecting mirror 24 can easily be adjusted by the variable resistor VR.

After the resonant light beam deflector 22 has been adjusted, image information is recorded on the photographic film F as follows: The synchronizing laser diode 14 is energized by the synchronizing LD driver 18 to emit the synchronizing laser beam $L_2$. The synchronizing laser beam $L_2$ is converted by the collimator 26 into a parallel laser beam, which is applied to the reflecting mirror 24 of the resonant light beam deflector 22. The reflecting mirror 24, as it oscillates, reflects and deflects the synchronizing laser beam $L_2$ in the main scanning direction and applies it through the $f\theta$ lens 28 to the grid 32. At this time, the oscillation of the reflecting mirror 24 is adjusted highly accurately by the light beam deflector controller 42.

Part of the synchronizing laser beam $L_2$ applied to the grid 32 passes through the slits 36 to the light guide rod 38, and is reflected by the inner surface of the light guide rod 38 toward the light detector 40. The light detector 40 converts the detected synchronizing laser beam $L_2$ into an electric signal, which is then supplied to the recording LD driver 16. The recording LD driver 16 generates a synchronizing signal of a certain period or pitch from the supplied electric signal.

Based on the generated synchronizing signal, the recording LD driver 16 supplies a drive signal modulated by an image signal to the recording laser diode 12. In response to the supplied drive signal, the recording laser diode 12 emits a recording laser beam $L_1$. The recording laser beam $L_1$ is converted by the collimator 20 into a parallel beam, which is applied to the reflecting mirror 24 of the resonant light beam deflector 22. The reflecting mirror 24 as it oscillates reflects and deflects the recording laser beam $L_1$ in the main scanning direction and applies it through the $f\theta$ lens 28 to the photographic film F between the nip rollers 34a, 34b. Since the photographic film F is fed in the auxiliary scanning direction by the drum 30, image information is two-dimensionally recorded on the photographic film F by the recording laser. beam $L_1$.

With the control system according to the present invention, since the feedback resistance of the differentiator 66 is adjusted by the variable resistor VR thereof, the oscillation of the oscillatory-mirror light beam deflector can easily be brought into an optimum state without damage to the reflecting mirror 24.

Although a certain preferred embodiment of the present invention has been shown and described in detail, it should be understood that various changes and modifications may be made therein without departing from the scope of the appended claims.

What is claimed is:

1. A control system for controlling an oscillatory-mirror light beam deflector, comprising:
    a drive circuit for applying a drive signal to energize the oscillatory-mirror light beam deflector;
    detector means for detecting the drive condition of the oscillatory-mirror light beam deflector and producing a drive condition signal indicative of the detected drive condition;
    a PID processor circuit having a proportional circuit, an integrator, and a differentiator, for generating an adjusting signal derived from said drive condition signal; and
    a processor for processing said drive condition signal with said adjusting signal to thereby produce said drive signal.

2. A control system according to claim 1, wherein said drive circuit includes an ON/OFF circuit for selectively turning on and off the oscillatory-mirror light beam deflector.

3. A control system according to claim 1, wherein said drive condition is the deflection angle of the oscillatory-mirror light beam deflector.

4. A control system according to claim 1, wherein said differentiator comprises means for differentiating a peak value of said drive condition signal.

5. A control system according to any one of claims 1 through 4, wherein said oscillatory-mirror light beam deflector comprises a resonant light beam deflector.

6. A control system according to claim 1, wherein said differentiator has a variable resistor.

7. A control system according to claim 3, wherein said detector means has a sensor coil for detecting said deflection angle.

* * * * *